Patented May 31, 1927.

1,630,818

UNITED STATES PATENT OFFICE.

OTTO ZELLER, OF EAST AURORA, AND CLEMENS WALDMAN, OF BUFFALO, NEW YORK, ASSIGNORS TO NATIONAL ANILINE & CHEMICAL COMPANY, INC., OF NEW YORK, N. Y., A CORPORATION OF NEW YORK.

SULPHUR-BLACK DYE.

No Drawing.    Application filed May 12, 1922.    Serial No. 560,438.

This invention relates to an improved sulphur black dye which is characterized by improved stability, and also to the improved method of its manufacture.

It has been heretofore proposed to dissolve undried sulphurized dyestuffs in sodium sulphide of such proportions as to give stable concentrated solutions of the same. It has also been proposed to prepare sulphur dye pastes by adding alkaline sulphide to precipitated sulphur black dyes in such amounts that it will all combine chemically with the said dye, leaving no uncombined or free alkaline sulphide.

According to the present invention, the sulphur black dye is produced, for example, by the action of an alkaline polysulphide upon dinitrophenol or its alkali metal salts and the undried precipitated resultant product, after isolation by filtration, converted into a dry stable product by the addition thereto of a regulated amount of alkali metal sulphide and subsequently drying the mixture. The amount of alkali metal sulphide added is a regulated and controlled excess over and above that which will chemically combine with the precipitated and isolated sulphur black dye in the undried and moist state at ordinary temperatures so that there will be a small amount of free alkali metal sulphide in the final dried product. The ratio of the weight of alkali metal sulphide to the weight of precipitated sulphur black with which it chemically combines before drying, calculated on a dry basis, is hereinafter referred to as the "saturation value".

The invention is applicable to the treatment of sulphur blacks of different composition and produced by different methods of production; and the amount of alkali metal sulphide which is added thereto before drying, over and above the amount of alkali metal sulphide required for the saturation value, may be modified or varied somewhat so as to effect changes, if desired, in the composition, or the stability, of the dried final product, and thus render it more satisfactory or adaptable for such specific uses or treatment to which it may be subsequently subjected.

The new dye composition of the present invention is obtained in the form of a dry product, and it is therefore distinguished from compositions in the form of solutions or in the form of pastes or products containing considerable amounts of water. It is further characterized by being partly or wholly soluble in water and of requiring relatively small amounts of sodium sulphide in the dye-bath when it is used in dyeing. The new product has the further advantage of being a stable product in that it resists to a high degree oxidation by contact with air and moisture on storage, and which does not develop sulphuric acid or an acid reaction upon storage even under unfavorable conditions over a relatively long period of time. The new product is remarkably stable toward elevated temperatures, for example, when heated to 210°–225° C. under ordinary atmospheric conditions for 2 to 3 hours it does not take fire and undergoes comparatively little alteration in shade. Further, when the new product is heated to 70–80° C. in moist air under ordinary atmospheric pressure for about 125 hours it undergoes substantially no, or very little, change in shade in its dyeing properties. The new product is different from the dried untreated dye, and also from the product obtained by evaporating to dryness the paste obtained by treating the precipitated dye with just enough sodium sulphide to chemically combine with the same, as regards shade when dyed on cotton, as regards solubility in water, and as regards stability either at ordinary or at elevated temperatures. Further, the new product easily admits of further treatment for standardization by mixing and grinding it with standardizing agents such as common salt, sodium carbonate, sodium sulphate, or other selected materials, or mixtures of the same.

In carrying out the process of the present invention, the precipitated and filtered sulphur black, usually in the form of moist press cake, paste, or wet powder, is treated with a pre-determined amount of sodium sulphide, either in the form of chips, lumps, crystals or solutions thereof, and the mixture under constant agitation evaporated to dryness, preferably in a rotary vacuum-drier under heat in the jacket furnished by steam under pressure. The product is usually dried until it contains 10 per cent or less of moisture. The product is subsequently standardized, if desired, by mixing and grinding it with standardizing material, preferably, in most cases, a mixture of common salt and sodium carbonate.

The saturation value of the precipitated sulphur black, for example the undried and moist press cake, is previously determined by adding to a weighed portion of it a concentrated solution of sodium sulphide of known strength to the point where the mixture, after standing 60-90 minutes, first shows the presence of uncombined or free sodium sulphide by the usual reactions, such as the blackening of a silver or copper coin. The amount of sodium sulphide added to the precipitated sulphur black before drying is always in excess of this saturation value, and is an amount usually not less than twice to five times the amount required for the saturation value in order to produce a sulphur black which, after being dried, possesses marked stability against deterioration on storage, or on exposure to air or to high temperatures. For example, if the amount of sodium sulphide which chemically combines with the press cake is found to be about 5 percent by weight of the solid material in the press cake, then the amount of sodium sulphide added to the press cake before drying is about 10 to 25 percent or more by weight of the solid material in the press cake. The sodium sulphide, which is added in large excess over and above the saturation value, mostly disappears during the operation of drying so that the dried final product contains a relatively small amount of free sodium sulphide.

The invention will be further illustrated by the following specific example:

A solution of the sodium salt of 4.2.1-dinitrophenol is added to a solution of sodium polysulphide and the resulting mixture heated to boiling and maintained at a temperature of 103°–105° C. for about 24 to 30 hours in a vessel connected with a reflux condenser. When the reaction is complete, the charge is diluted with water and aerated by the introduction of a current of air to precipitate the dyestuff which may then be filtered off in a filter press. The dyestuff may also be precipitated by the addition of mineral acids.

It is found by analysis that the moist press cake thus obtained, and containing, for example, 1200 lbs. of total solids in 2500 lbs. of paste, will chemically combine with 60 lbs. of sodium sulphide (100%). To the press cake there is then added, with constant agitation, 320 lbs. of 60 percent sodium sulphide previously dissolved in 500 lbs. of water. This amount of sodium sulphide is 16 percent of the weight of total solids present in the press cake. The addition of the sodium sulphide to the sulphur black paste may take place in a rotary vacuum-drier which may be subsequently closed and the drying then carried out under a gauge vacuum of about 25 to 27 inches of mercury for 15–20 hours at a temperature obtained by using about 20 lbs. of steam pressure in the heating jacket until the product has been converted to a dry powder. The temperature can be somewhat increased, for example, by using steam at a higher pressure (e. g. 75 lbs.), while the vacuum may be also increased, for example, to about 30 inches. The amount of sodium sulphide can be varied to vary the degree of stability of the product, but must always be in excess of the saturation value.

The new dyestuff produced as a dry product in accordance with the above specific example is a remarkably stable product in that it does not develop sulphuric acid on storage at ordinary temperatures in wooden or metal containers nor undergo appreciable change in shade, strength, or solubility over a considerable period of time (e. g., 6 months or more). It is a composite product and contains the dye itself together with a regulated amount of sodium sulphide; and said composite product changes somewhat during standardization by mixing and grinding with common salt and sodium carbonate, particularly with reference to the sodium sulphide present which is considerably lessened in amount. The new dyestuff is somewhat soluble in water, and in sodium sulphite solutions. It dyes cotton directly from a sodium sulphide bath and produces greenish-black shades.

It will be understood that the invention is applicable to the production of stable sulphur black dyes from sulphur blacks of different composition and made by different methods of production, and that a variation in the proportion of ingredients, as well as the time and temperature of drying, may be made within wide limits without departing from the spirit and scope of the invention.

We claim:

1. The method of stabilizing sulphur black dyestuffs, which comprises drying moist sulphur black dyes in admixture with proportions of alkali metal sulphide in excess of that which chemically combines at ordinary temperature with said dyes in the moist condition.

2. The method of stabilizing dyestuffs of the sulphur black type, which comprises admixing isolated and undried dyes of the sulphur black type with an amount of alkali metal sulphide in excess of that which chemically combines with said dyes in the moist condition, and subsequently drying the admixture to form stablized products.

3. The method of stablizing sulphur black dyestuffs, which comprises treating precipitated sulphur black, obtained directly in its manufacture, with alkali metal sulphide in presence of water, the alkali metal sulphide being in excess of that amount which combines chemically with said precipitated dye, and drying the resultant product to form a stable powder.

4. The method of stabilizing sulphur black dyes, which comprises treating precipitated and moist sulphur black, obtained by the action of sodium polysulphide on dinitrophenol and isolating the precipitated dye by filtration, with two to five times the amount of sodium sulphide which is capable of combining with said precipitated dye in the presence of water at ordinary temperature, and subsequently drying the mixture under a vacuum to form a dry stable powder.

5. The method of stabilizing a sulphur black composition, which comprises treating a precipitated and undried filter cake of a sulphur black dye, obtained by the action of sodium polysulphide upon dinitrophenol in the presence of water maintained at a temperature of 103-105° C., and subsequently precipitating and filtering off the dye, with a weight of sodium sulphide equal to 16 percent of the weight of total solids in the filter cake and subsequently drying the mixture to produce a dry stable powder.

6. As a new product, a stabilized sulphur black composition comprising a sulphur black dye in combination with an amount of alkali metal sulphide in excess of that which said dye chemically combines with in the moist condition at ordinary temperatures, said composition being in the form of a powder.

7. As a new product, the stable sulphur black composition containing sulphur black produced by the action of an alkaline polysulphide on dinitrophenol, said composition containing the sulphur black in combination with an alkali-metal sulphide and containing an excess of the alkali metal sulphide, said product being in the form of a dry stable powder.

8. A stable sulphur black composition in the form of a dry powder said product containing sulphur black in combination with sodium sulphide and containing free sodium sulphide.

9. A stable sulphur black composition in the form of a dry powder, said product containing the sulphur black in combination with an alkali metal sulphide and containing free alkali metal sulphide common salt and sodium carbonate.

10. Products derived from undried isolated sulphur blacks by adding to them two to five times the amount of alkali metal sulphide which will chemically combine with them in the presence of water at ordinary temperature, and subsequently drying the mixture to dry powders.

11. A sulphur black composition obtainable by inducing a reaction between a precipitated and undried sulphur black dye and alkali metal sulphide, said sulphide being in excess of that amount which chemically combines at ordinary temperature with said dye, and said composition being a powder.

12. A sulphur black composition obtainable by drying an isolated and moist sulphur black dye admixed with two to five times the amount of alkali metal sulphide which is capable of combining with said dye in the presence of water at ordinary temperature.

13. As a new product, a sulphur black composition obtainable by drying under a vacuum precipitated moist sulphur black admixed with about sixteen percent of its weight, on the dry basis, of sodium sulphide.

14. As a new product, a stabilized sulphur black composition obtainable by evaporating to dryness an admixture of precipitated sulphur black, as obtained directly in its manufacture, with a concentrated aqueous solution of sodium sulphide, said aqueous solution of sodium sulphide containing an amount of sodium sulphide in excess of that capable of combining at ordinary temperature with said precipitated sulphur black.

15. The method of making stabilized sulphur black dyestuffs, which comprises drying under non-oxidizing conditions moist sulphur black dyes in admixture with proportions of alkali metal sulphide in excess of that which chemically combines at ordinary temperature with said dyes in the moist condition.

16. The method of making stabilized dyestuffs of the sulphur black type, which comprises admixing isolated and undried dyes of the sulphur black type with an amount of alkali metal sulphide in excess of that which chemically combines with said dyes in the moist condition, and subsequently drying under non-oxidizing conditions the admixture to form stabilized products.

17. The method of making stable sulphur black dyestuffs, which comprises treating moist precipitated sulphur black with alkali metal sulphide in the presence of water, the alkali metal sulphide being in excess of that amount which combines chemically with said precipitated dye, and drying the resultant product under non-oxidizing conditions to form a stable powder.

18. The method of making stabilized sulphur black dyestuffs, which comprises drying in a vacuum moist sulphur black dyes in admixture with proportions of alkali metal sulphide in excess of that which chemically combines at ordinary temperature with said dyes in the moist condition.

19. The method of making stabilized dyestuffs of the sulphur black type, which comprises admixing isolated and undried dyes of the sulphur black type with an amount of alkali metal sulphide in excess of that which chemically combines with said dyes in the moist condition, and subsequently drying the admixture in a vacuum to form stabilized products.

20. The method of making stable sulphur black dyestuffs, which comprises treating precipitated moist sulphur black with alkali metal sulphide in the presence of water, the alkali metal sulphide being in excess of that amount which combines chemically with said precipitated dye, and drying the resultant product in a vacuum to form a stable powder.

21. Stabilized products derived from sulphur black dyestuffs by adding to them an amount of alkali metal sulphide in excess of that which chemically combines with them in the presence of water at ordinary temperature and subsequently drying the admixture under non-oxidizing conditions.

22. Products derived from dyestuffs of the sulphur black type by adding to them an amount of alkali metal sulphide in excess of that which, in the presence of water, chemically combines with them at ordinary temperatures, and subsequently drying the admixture under substantially non-oxidizing conditions and at a temperature not higher than 110° C.

23. The method of stabilizing sulphur black dyestuffs, which comprises drying under diminished pressure, preferably a pressure not to exceed that equal to about 5 inches of mercury, an admixture of a sulphur black dye, as obtained directly in its manufacture, with an amount of alkali metal sulphide in excess of that which chemically combines at ordinary temperature and pressure with said dyes in the moist condition.

24. A sulphur black composition obtainable by drying an undried sulphur black dye admixed with an alkali metal sulphide, said composition characterized by having the property of undergoing comparatively little alteration in shade when heated to 210°–225° C. under atmospheric conditions for about 2 hours.

25. A sulphur black composition characterized by having the property of not taking fire, and of undergoing comparatively little alteration in shade when heated to 210°–225° C. under atmospheric conditions.

26. A sulphur black composition characterized by having the property of not taking fire when heated to about 210°–225° C. under atmospheric conditions.

27. As a new product, a stable sulphur black composition derivable from a sulphur black by admixing it with two to five times the amount of alkali metal sulphide which is capable of chemically combining with it in the presence of water at ordinary temperatures under atmospheric pressure and subsequently drying the admixture to a powder in a partial vacuum, said stable sulphur black composition dyeing cotton greenish-black shades from a sodium sulphide bath.

28. The method of stabilizing sulphur black dyestuffs which comprises admixing them with an amount of alkali metal sulphide about two to five times their saturation value, and subsequently drying the admixture to a powder in a partial vacuum.

29. The method of stabilizing dyestuffs of the sulphur black type which comprises admixing dyes of the sulphur black type with an aqueous solution containing an amount of alkali metal sulphide about two to five times that which is capable of chemically combining with them at ordinary temperatures and drying the admixture to a powder under a partial vacuum.

30. Products derived from undried and isolated sulphur black dyestuffs by adding to them an amount of alkali metal sulphide in excess of that which chemically combines with them in the presence of water at ordinary temperatures and subsequently drying the admixture under a partial vacuum.

31. As a new product, a sulphur black composition obtained by drying to a powder under a vacuum an isolated moist sulphur black, mixed with an amount of alkali metal sulphide equivalent to about ten to twenty-five per cent of sodium sulphide calculated on the dry weight of the sulphur black.

32. A sulphur black composition obtainable by drying to a powder in a partial vacuum an undried sulphur black admixed with an alkali metal sulphide, said composition being characterized by undergoing compositively little change in the shade which it produces on dyeing when heated in moist air to about 75°–80° C. under ordinary atmospheric pressure for about 125 hours.

33. A sulphur black composition obtainable by drying to a powder in a partial vacuum an isolated and undried dye of the sulphur black type with sodium sulphide, said composition being characterized by being at least partly soluble in water.

34. A sulphur black composition obtainable by evaporating to dryness in a vacuum an admixture of sulphur black, as obtained in its manufacture by the action of sodium polysulphide on a dinitrophenol substance, with an aqueous solution of sodium sulphide which contains about two to five times the amount of sulphide capable of giving the saturation value, said composition being characterized by undergoing substantially no change in the shade which it produces on dyeing when heated in moist air at about 75°–80° C. under ordinary atmospheric pressure for about 125 hours.

35. Products derived from sulphur blacks by adding to them about two to five times the amount of sodium sulphide required to give the saturation value and subsequently drying the mixture to a powder under a vacuum at a temperature not higher than about 160° C.

In testimony whereof we affix our signatures.

OTTO ZELLER.
CLEMENS WALDMAN.